(No Model.) 2 Sheets—Sheet 1.

A. J. BATES.
SEEDER AND CULTIVATOR.

No. 460,079. Patented Sept. 22, 1891.

Witnesses.
Jos W Crookes
H. M. Byrne

Inventor.
Andrew J. Bates by
Paul Bakewell
his attorney

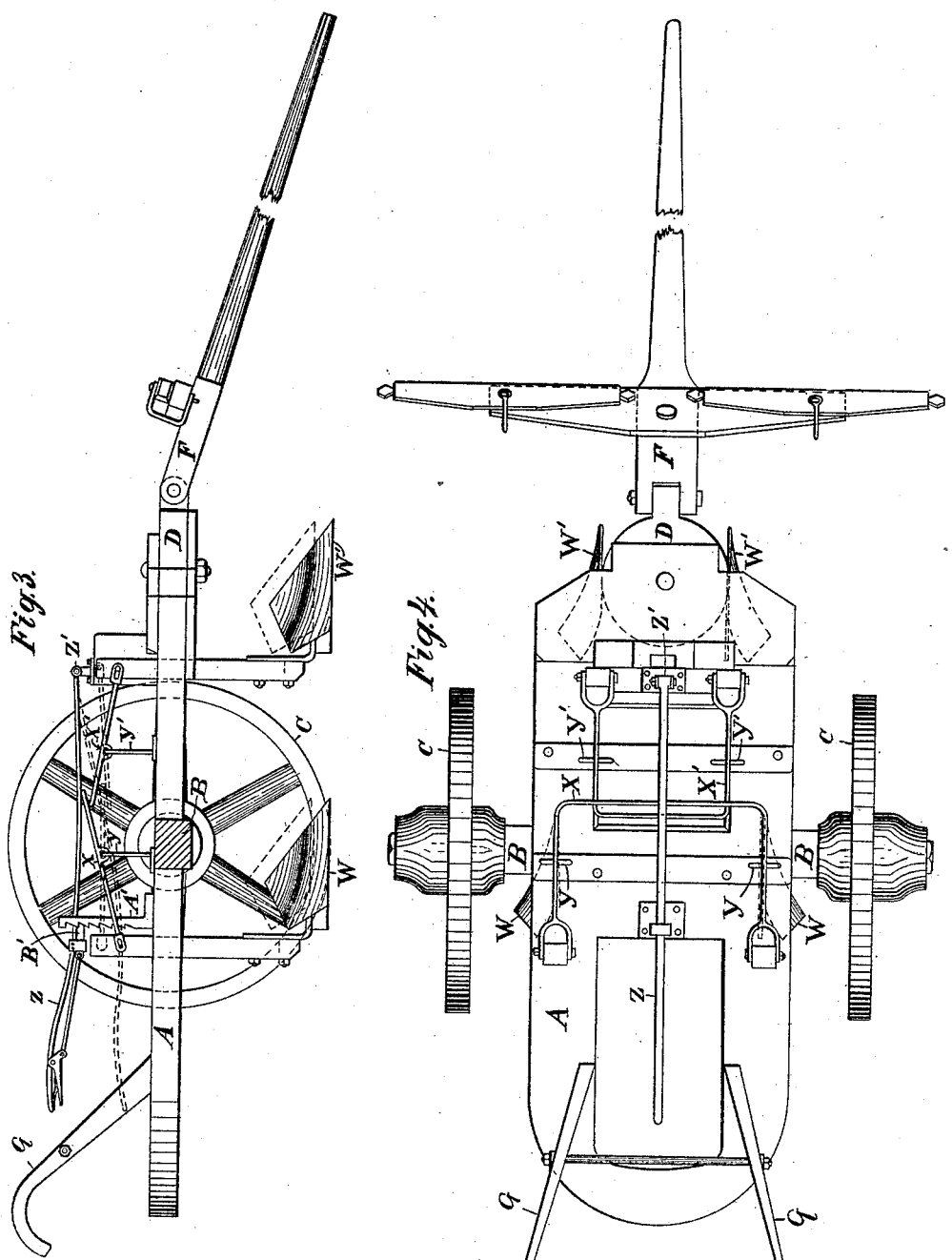

UNITED STATES PATENT OFFICE.

ANDREW J. BATES, OF CARLINVILLE, ILLINOIS, ASSIGNOR OF ONE-HALF TO WILLIAM E. P. ANDERSON, OF SAME PLACE.

SEEDER AND CULTIVATOR.

SPECIFICATION forming part of Letters Patent No. 460,079, dated September 22, 1891.

Application filed April 24, 1891. Serial No. 390,261. (No model.)

*To all whom it may concern:*

Be it known that I, ANDREW J. BATES, a citizen of the United States, residing at Carlinville, in the county of Macoupin and State of Illinois, have invented certain new and useful Improvements in Seeders and Cultivators, of which the following is a full, clear, and exact description.

My invention relates to farming implements for placing seed in the ground and for cultivating the crop; and it consists, mainly, in a platform or truck-frame provided with a hopper-opening and opening for the covering-roller and a series of openings for plow or cultivator standards, said openings adapted to receive detachable and interchangable devices, whereby the machine may be used at will either as a seeder or cultivator; and, secondarily, the combination, with a frame of the character specified, of a detachable furrow-plow seed-hopper and covering-roller, all as will hereinafter more fully appear.

The accompanying drawings, in which like letters of reference denote like parts in the several figures, serve to illustrate my invention.

Figure 1:
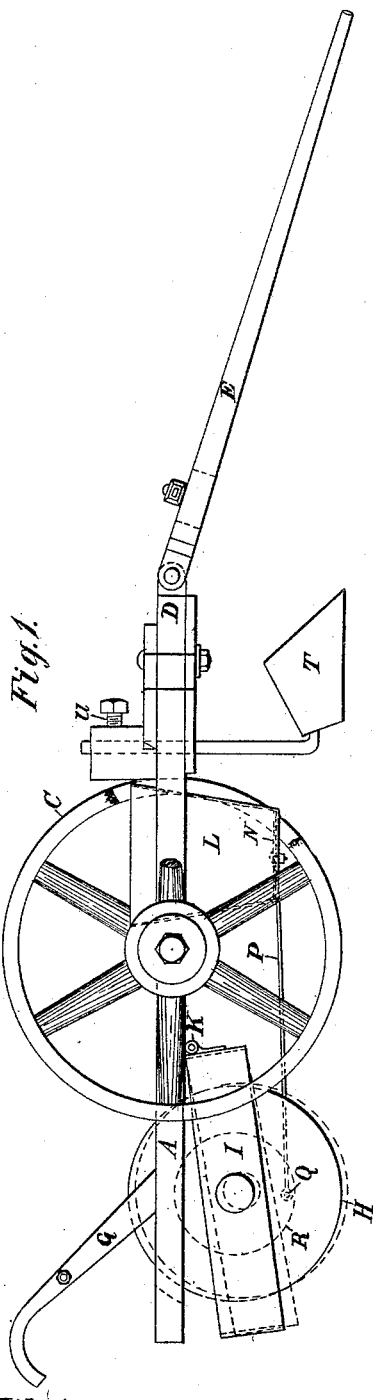
Figure 2:
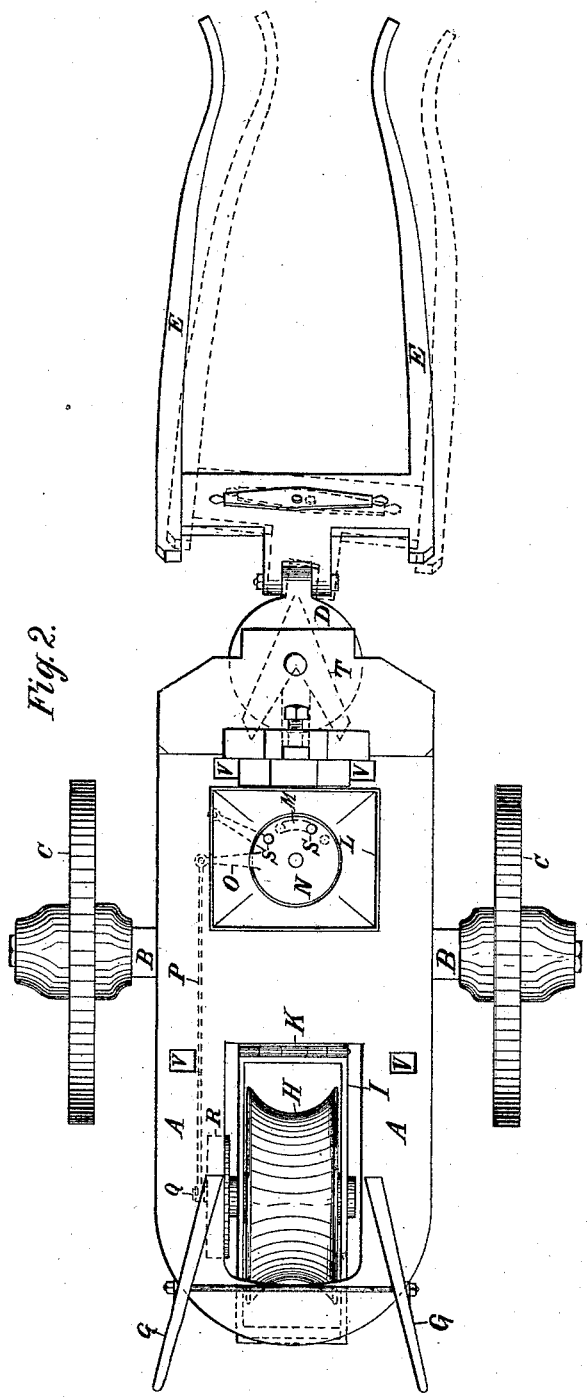

Figures 1 and 2 are respectively a side elevation and plan view of my improved implement adapted to be used as a seeder, and Figs. 3 and 4 are respectively a side elevation and plan view of the same adapted to be used as a cultivator.

A is a platform or truck-frame which acts as the supporting frame-work of my machine.

B is the axle secured to the frame A.

C C are the supporting-wheels.

D is a horizontal plate which is pivotally secured in the front end of the frame A and to which the shafts E (see Figs. 1 and 2) and the tongue F (see Figs. 3 and 4) are secured, by which the machine as a whole is drawn.

G G are handles for holding and steadying the machine when at work.

H is a large grooved roller, which is revolubly secured in a frame I. The front end of the frame I is removably secured to the under side of the frame A to the rear of the axle B (see Fig. 1) by a hinge K in such manner as to permit of a vertical movement of the frame I and with it the roller H, in order that the roller H may readily adjust itself by its own weight to uneven ground, a hole being cut in the frame A for this purpose, as shown in Figs. 2 and 4.

In the frame A, in front of the axle B, is cut a hole (see Fig. 4) convenient to receive a removable seed-hopper L, in the flat bottom of which is cut a segmental slot M. (Shown in dotted lines in Fig. 2.) This opening M is normally closed by disk-plate N, pivotally secured to the bottom of the hopper L. To the plate N is secured an arm O, which is connected by a rod P to a crank-pin Q on a disk-wheel R, mounted on one end of the axle of the roller H. Two holes S are formed in the plate N, radially equidistant with the segmental slot M, from the pivot-point about which the plate N is oscillated as a center, as hereinafter described, and of such a distance apart as to alternately be brought into a position to uncover the slot M.

Immediately in front of the hopper L a hole is formed convenient for receiving the standard of a double or furrow plow T, which is secured therein at the desired height by a set-screw U. (See Fig. 1.)

V V V V (see Figs. 2 and 4) are vertical perforations through the frame A for receiving the standards of the small one-sided cultivating or diamond plows W and W'. The upper ends of the standards of the plows W are secured to the ends of the U-shaped cradle-frame X, which are pivotally supported on short standards Y, removably secured to the frame A. The front set of plows are similarly secured to the cradle-frame X', supported on the standards Y'. The two frames X and X' are turned toward each other, so that their middle portions are in a position to both be operated together by the lever-bar Z, which is pivotally secured at its forward end at Z' to the frame A.

A' is a ratchet-standard, with which the spring-pawl B' is adapted to engage and fix the position of the lever-bar Z.

The operation of my machine is as follows: As a seeder, attach to the frame A the furrow-plow T, the seed-hopper L, and connecting-rod P, and the frame I with the roller H. Seed having been put into the hopper L, the machine is drawn forward by an animal hitched to the same in the shafts E. The roller H will be given a motion of rotation and will, through the crank-pin Q, connecting-rod P, and arm O, give the plate N an oscillating movement necessary to bring the holes S in a position to uncover the slot M, when a portion of the seed in hopper L is dropped. It will be seen that there will be two hills of seed for each revolution of the roller H, and the distance between hills is determined by the diametrical size of the roller H; and, further, when it is desired to drill the seed the connecting-rod P may be dispensed with and a conveniently-sized opening left continually open during the operation of the machine through the bottom of the hopper L. The furrow-plow T will form a furrow or ditch into which the seed is dropped from the hopper, the depth of such ditch being adjusted by securing the plow T by the set-screw U at the desired height. The groove in the circumferential surface of the roller H will tend to throw the soil back into the furrow into which the seed has been dropped and cover the same. When it is desired to turn, as at the end of the field, the furrow-plow T may be raised out of the ground by pressing down on the handles G G.

As a cultivator, the detachable parts used in the machine as a seeder, as described, are removed, and to the frame A are secured the cradle-bars X and X', their free ends being secured to the standards of the plows W and W', respectively, which are inserted in the holes V, formed in the frame A, and the pivoted bar Z. The plows W and W' are made in pairs, so that they may be set in the frame A, so as to all of them throw the ground to or away from the crop cultivated, so that it may be used as a cultivator in laying to or in laying by the crop.

When it is desired to turn the machine around, as at the end of the field, or for any other reason it is desired to raise the plows relative to the frame A of the machine out of the ground to the position shown in dotted lines in Fig. 3, the lever Z is depressed and locked in any desired position by allowing the spring-pawl B' to engage in one of the notches formed in the ratchet-standard A'.

I claim—

1. A combined seeder and cultivator frame or truck having a platform provided with a series of longitudinal central openings adapted to receive a detachable seed-hopper and covering-roller, and lateral openings adapted to receive plow-standards, substantially as and for the purposes specified.

2. The combination, with a truck-platform having a series of longitudinal central openings adapted to receive the standard of a furrow-plow, a seed-hopper, and a covering-roller, of a detachable furrow-plow, a detachable seed-hopper, and a covering-roller detachably secured to the platform by a hinge connection, substantially as and for the purposes specified.

3. The combination, with the truck-platform A, having the longitudinal central openings for the seed-hopper and covering-roller, of the detachable seed-hopper L, the detachably-hinged roller-frame I, the covering-roller H, journaled in the frame, and the rod or pitman P, which connects the feed-disk of the seed-hopper with the covering-roller, substantially as and for the purposes specified.

In testimony whereof I have affixed my signature, in presence of two witnesses, this 10th day of April, 1891.

ANDREW J. BATES.

Witnesses:
  W. W. FREEMAN,
  FRANK E. FAY.